July 24, 1934. E. D. BOISSELIER Re. 19,248

HEADLIGHT FOR TOY LOCOMOTIVES

Original Filed Jan. 30, 1933

Inventor

E. D. Boisselier,

By D. P. Wickhamsley

Attorney

Reissued July 24, 1934 Re. 19,248

UNITED STATES PATENT OFFICE 19,248

HEADLIGHT FOR TOY LOCOMOTIVES

Earl D. Boisselier, Chicago, Ill., assignor to American Flyer Manufacturing Company, Chicago, Ill., a corporation of Illinois Original No. 1,914,324, dated June 13, 1933, Serial No. 654,330, January 30, 1933. Application for reissue July 1, 1933, Serial No. 678,701

18 Claims. (Cl. 46—48)

This invention relates to headlights for toy locomotives, and has generally in view to provide a novel electrical headlight unit especially for use on mechanically propelled as distinguished from electrically propelled locomotives, although the unit may be used on any toy locomotive whether mechanically, electrically or otherwise propelled.

Toy locomotives usually are constructed to simulate large steam locomotives. Usually, therefore, a toy locomotive is inclusive of a body simulating the boiler of a large steam locomotive, and as a rule this boiler simulating body is hollow. In any event it is with toy locomotives of the type having hollow boiler simulating bodies that the present headlight unit is particularly designed for use, and in this connection one of the special objects of the invention is to provide a novel unitary means for mounting the headlamp at the front of the boiler simulating body and for mounting a current supplying dry cell, or cells, in a concealed position within the boiler simulatting body.

Another special object of the invention is to provide for ease and facility in applying the unit firmly in an operative position upon a toy locomotive, and for equal ease and facility in removing the unit for replacement of a dry cell or cells, or for inspection or other purposes.

Another object of the invention is to provide a headlight unit for toy locomotives which does not require wires for conducting current from the dry cell or cells to the headlamp.

Another object of the invention is to provide a visor for the headlamp and a novel means of mounting the visor.

Another object of the invention is to provide a toy locomotive headlight unit which is of simple, inexpensive construction, which is strong, durable and reliable, and which produces an effect similar to the headlight of a large locomotive.

With the foregoing and other objects in view, which will become more fully apparent as the nature of the invention is better understood, the same consists in the novel features of construction, combination and arrangement of parts as will be hereinafter more fully described, illustrated in the accompanying drawing and defined in the appended claims.

In the drawing, wherein like characters of reference denote corresponding parts in the different views:—

Figure 1:
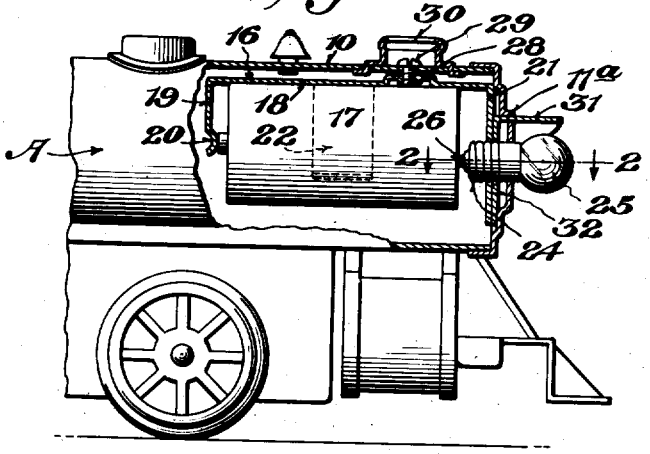
Figure 1 is a fragmentary side elevation, partly in longitudinal section, of a toy locomotive equipped with a headlight unit constructed in accordance with one practical embodiment of the invention.
Figure 2:
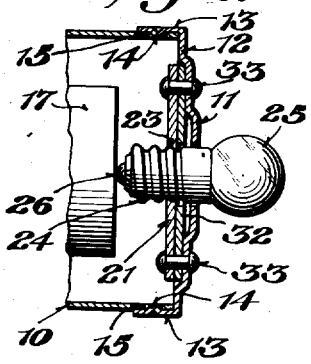
Figure 2 is a horizontal section on the line 2—2 of Fig. 1.
Figure 3:
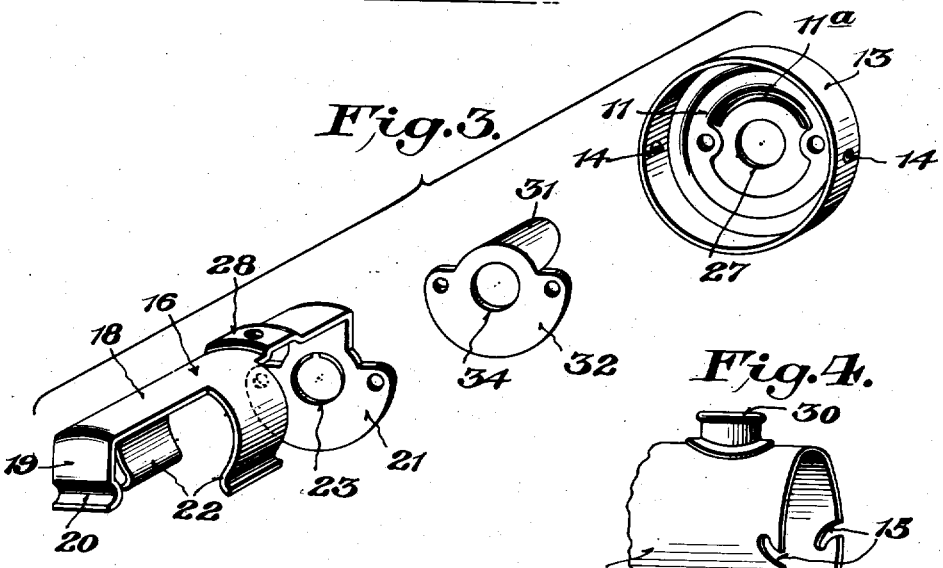
Figure 3 is a perspective view showing the parts of the unit in separate relationship.
Figure 4:
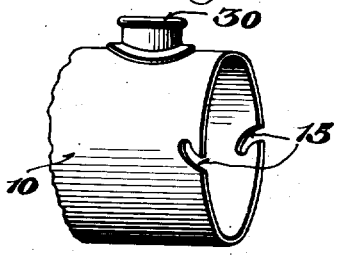
Figure 4 is a detail perspective view of the front end of the boiler simulating body of the locomotive.

Referring in detail to the practical embodiment of the invention illustrated in Figs. 1 to 4 of the drawing, A designates generally a portion of a toy locomotive which may be of any type having a hollow boiler simulating or equivalent body as indicated at 10, while 11 designates a removable closure for the open front end of said body.

While the closure 11 may be of any suitable construction it preferably is constructed in the form of a cup having a front wall 12 and a marginal side wall or flange 13 to fit snugly and firmly either over or into the front end of the body 10, and while any suitable means may be employed for removably securing said closure in closing relationship to the front end of said body 10, the means preferably employed for this purpose comprises a pair of pins 14 carried by the wall or flange 13 at suitably spaced points to engage bayonet slots 15 formed in and opening through the front end of the body 10. Thus, the closure 11 may easily and firmly be applied to the boiler simulating body simply by inward movement and subsequent slight rotation thereof, and may equally as readily and easily be removed simply by a reverse operation.

A holder 16 for an electric cell or cells 17 of the small cylindrical "flashlight" type is formed from a suitably shaped blank of sheet metal stamped or otherwise provided and comprises a longitudinally extending top portion 18, a rear end portion in the form of a tongue 19 bent downwardly from the top portion and provided with an inwardly directed rib 20 constituting a contact for engagement with the terminal at one end of the cell 17, a forward end portion 21 substantially in the form of a disk bent downwardly from the top portion, and one or more resilient cell embracing tongues 22 extending downwardly from each side of the top portion intermediate the ends thereof.

The holder 16 may be of a length to accommodate between the end portions 19 and 21 thereof only a single cell 17 or two or more cells disposed in end to end relationship, and, as is apparent, the cell or cells, as the case may be, is or are firmly but removably retained in assembly with the holder by the resilient cell embracing tongues 22.

Centrally in the disk-like forward end portion 21 of the holder is provided an opening 23 surrounded by suitably formed screw threads for the reception of the threaded base 24 of a small electric headlamp 25. At its inner end the lamp 25 carries a contact 26 for engagement with the contact at the forward end of the cell 17. Thus, when a cell 17 is disposed within the holder with the terminal at the rear end of the cell in engagement with the rib 20 of the tongue 19 and the terminal at the forward end of the cell engaged by the contact 26 of a lamp screwed into the opening 23, a circuit is completed through the lamp and the cell by way of the holder 16 and the lamp is lighted. On the other hand, the circuit may be interrupted simply by unscrewing the lamp until the contact 26 becomes disengaged from the forward terminal of the cell 17.

The holder 16 is mounted at its forward end on the closure 11 at the inner side thereof, the closure being provided with a central opening 27 to accommodate the base 24 of the lamp 25 which, in the operative assembly of the unit, is disposed forwardly of the closure. Consequently, when the closure 11 is applied to the boiler simulating body 10 in closing relationship to the front end thereof the holder 16 and the cell 17 are disposed within the hollow body 10 and the headlamp 25 is exposed at the front of the closure where it may be lighted or extinguished simply by slight rotation thereof as heretofore explained.

In some instances it may be desirable to provide a more secure support for the holder 16 than is afforded by the closure 11, and in this event the top portion 18 of the holder may be offset upwardly as indicated at 28 and provided in said offset with a threaded opening to receive the inner end of a screw 29 extending downwardly through an opening in the top of the boiler simulating body 10 and surrounded, for example, by the usual smoke stack simulating element 30, whereby the screw is concealed. The added support furnished by the screw 29 serves to secure the holder firmly in place in the event of any looseness or play between the closure 11 and the body 10.

Preferably, but not necessarily, a visor 31 is provided for the headlamp 25, and the inclusion of this visor in the unit constitutes one of the novel features of the invention. As illustrated, the visor is inclusive of a forwardly directed hood portion and a vertically disposed disk-like portion 32 at the rear end thereof. The front wall of the closure 11 is slotted at 11a above and concentrically with respect to the opening 27 therein, and in assembling the visor with the closure the hood of the visor is extended from the inner side of the closure through said slot until the disk-like portion 32 of the visor engages the inner face of the front wall of the closure. The disk-like forward end portion 21 of the holder 16 then is disposed against the disk-like portion 32 of the visor, and rivets or other suitable fasteners 33 are engaged through alined openings in the front wall of the closure and the disk-like visor and holder portions 32 and 21 to secure the holder and visor in assembly with the closure. The disk-like portion 32 of the visor is, of course, provided with an opening 34 for alinement with the opening 27 in the front wall of the closure 11 to accommodate the lamp base 24; and, as shown, the hood portion of the visor extends forwardly of the closure 11 above and partially in surrounding relationship to the lamp 25. Obviously, if the visor is not used, the closure 11 need not be slotted and the disk-like portion 21 of the holder 16 may be secured directly against the front wall of the closure.

Figure 5:
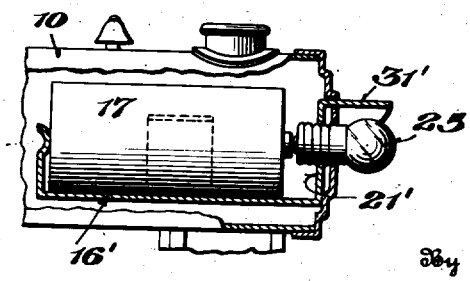
Figure 5 is a view similar to Fig. 1 illustrating an alternative embodiment of the invention.

Referring to Fig. 5 of the drawing, it will be observed that the holder 16′ is inclusive of a visor 31′ formed as an integral extension of the front disk-like portion 21′ of the holder. In other respects the unit shown in Fig. 5 is or may be substantially the same as shown in Figs. 1 to 4.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:—

1. In a toy locomotive having a hollow boiler simulating body open at its front end, a removable closure for the front end of said body, an electric cell holder attached to said closure at the inner side thereof for disposition within the hollow body when the closure is applied thereto, and means for supporting an electric lamp with its bulb exposed at the front of the closure and its base operatively engaged with the holder for inclusion in circuit with a cell carried by the holder.

2. In a toy locomotive having a hollow boiler simulating body open at its front end, a removable closure for the front end of said body, an electric cell holder attached to said closure at the inner side thereof for disposition within the hollow body when the closure is applied thereto, the closure having an opening to accommodate the base of an electric lamp, and the holder having means to receive and hold the base of the lamp with the contacts thereof in circuit with a cell carried by the holder.

3. In a toy locomotive having a hollow boiler simulating body open at its front end and inclusive of a removable closure for the front end thereof, a headlight unit carried entirely by the closure and inclusive of a cell holder extending rearwardly from the closure for disposition within the hollow body when the closure is applied thereto, and an electric lamp exposed at the front of the closure and having its base engaged with and held by the holder in circuit with a cell carried by the holder.

4. In a toy locomotive having a hollow boiler simulating body open at its front end and inclusive of a removable closure for the front end thereof, an electric cell holder attached to said closure at the inner side thereof, said holder having a contact at its rear end for engagement with the terminal at the rear end of a cell carried by the holder, and means at the front end of the holder to receive and hold the base of an electric lamp with a contact of the lamp engaged with the terminal at the front end of a cell carried by the holder, the closure having a lamp base to permit attachment and detachment of the lamp with and from the holder when the closure is applied to the body and to permit the lamp bulb to be exposed forwardly of the closure when the lamp is in an applied position.

5. In a toy locomotive having a hollow boiler simulating body open at its front end and inclusive of a removable closure for the front end thereof, an electric cell holder attached to said closure at the inner side thereof, the closure having an opening and a slot, a lamp inclusive of a bulb exposed at the front of the closure and a base extending through the opening in the closure and received and held by the holder, means to include said lamp in circuit with a cell carried by the holder, and a lamp visor attached to the closure at the inner side thereof and projecting through the slot in the closure forwardly thereof in shielding relationship to the lamp bulb.

6. In a toy locomotive having a hollow boiler simulating body open at its front end and inclusive of a removable closure for the front end thereof, an electric cell holder attached to the closure at the inner side thereof, an electric lamp having a bulb exposed at the front of the closure and having its base extending through the closure and engaged with the holder for movement to make and break a circuit therethrough, and a visor formed integrally with the holder and projecting through the closure forwardly thereof in shielding relationship to the lamp bulb.

7. In a locomotive having a hollow boiler simulating body open at its front end and inclusive of a removable closure for the front end thereof, an electric cell holder comprising a longitudinal member, a cell terminal engaging contact finger at the rear end thereof, cell holding tongues at the sides thereof, a threaded lamp base receiving formation at the front thereof, and means fastening the lamp base receiving formation to the closure at the inner side thereof, the closure having an opening for the insertion of a lamp base into said lamp base receiving formation.

8. In a toy locomotive having a hollow boiler simulating body open at its front end and inclusive of a removable closure for the front end thereof, an electric cell holder comprising a longitudinal member, a cell terminal engaging contact element at the rear end thereof, cell holding tongues at the sides thereof, a threaded lamp base receiving formation at the front thereof, a visor having an attaching formation interposed between the lamp base receiving formation of the holder and the inner side of the closure, fasteners extending through the lamp base receiving formation and through the visor attaching formation and the closure securing the holder and the visor to the closure, the closure having an opening for insertion of a lamp base into the lamp base receiving formation of the holder, and the visor extending through the closure forwardly thereof.

9. In a toy locomotive, a boiler simulating body, a detachable front end for said body, an electric battery holder concealed within said body and attached to said detachable front end, and a detachable electric lamp having a supporting and electric-contact engagement with said holder.

10. In a toy locomotive, a hollow boiler simulating body having an opening in its front end, a metallic battery holder mounted within the boiler, a battery carried by said holder and having one terminal thereof directly engaging the holder, and a lamp mounted in alinement with said opening with one terminal thereof directly engaging the holder and the other terminal thereof directly engaging the other battery terminal.

11. The arrangement defined in claim 9 in which the holder carries a lamp visor extending through an opening in the front end of the boiler body.

12. The arrangement defined in claim 10 in which the holder carries a lamp visor extending through an opening in the front end of the boiler body.

13. In a toy locomotive having a hollow boiler simulating body open at its front end, a closure for the front end of said body, an electric cell holder attached to said closure at the inner side thereof for disposition within the hollow body when the closure is applied thereto, and means for supporting an electric lamp with its bulb exposed at the front of the closure and its base operatively engaged with the holder for inclusion in circuit with a cell carried by the holder.

14. In a toy locomotive having a hollow boiler simulating body open at its front end, a closure for the front end of said body, an electric cell holder carried by the closure within the hollow body when the closure is applied thereto, the closure having an opening to accommodate the base of an electric lamp, and the holder having means to receive and hold the base of the lamp with the contacts thereof in circuit with a cell carried by the holder.

15. In a toy locomotive having a hollow boiler simulating body inclusive of a closure for the front end thereof, an electric cell holder disposed within said boiler simulating body, said holder having a contact at its rear end for engagement with the terminal at the rear end of a cell carried by the holder, and means at the front end of the holder to receive and hold the base of an electric lamp with a contact of the lamp engaged with the terminal at the front end of a cell carried by the holder, the closure having an opening to permit attachment and detachment of the lamp with and from said means on the holder and to permit the lamp bulb to be exposed forwardly of the closure when the lamp is in an applied position.

16. In a toy vehicle, a hollow metal body having a lamp opening and battery holding means adjacent the opening, a battery cell having one terminal in conductive relation to the metal body through the battery holding means, and a lamp exposed through said lamp opening and having one of its terminals directly engaging one battery terminal and having its other terminal in conductive relation to said metal body.

17. In a toy vehicle, a metal body having a lamp opening therein, battery holding means within the body, a battery held by said holding means and having one terminal in conductive relation to the metal body through said battery holding means, and a lamp exposed through said opening and having one of its terminals in direct contact with one battery terminal and having its other terminal in conductive relation to said metal body through the battery holding means.

18. A toy locomotive construction including a hollow metal body provided at one end with a lamp socket opening, a metallic battery holder unit having a supporting fastening connection with the said body, said battery holder carrying a metallic contact member, an electric battery dry cell supported in position by the battery holder and adapted to have one of its terminals tightly engaged with said contact member on the battery holder, and an electric lamp received in said lamp socket opening and having one of its terminals grounded through the said body, the battery holder and said contact member on the latter, and having its other terminal in conductive relation to the other battery terminal.

EARL D. BOISSELIER.